J. N. ALSOP.
PROCESS OF TREATING FLOUR.
APPLICATION FILED NOV. 19, 1914.
1,184,295.
Patented May 23, 1916.
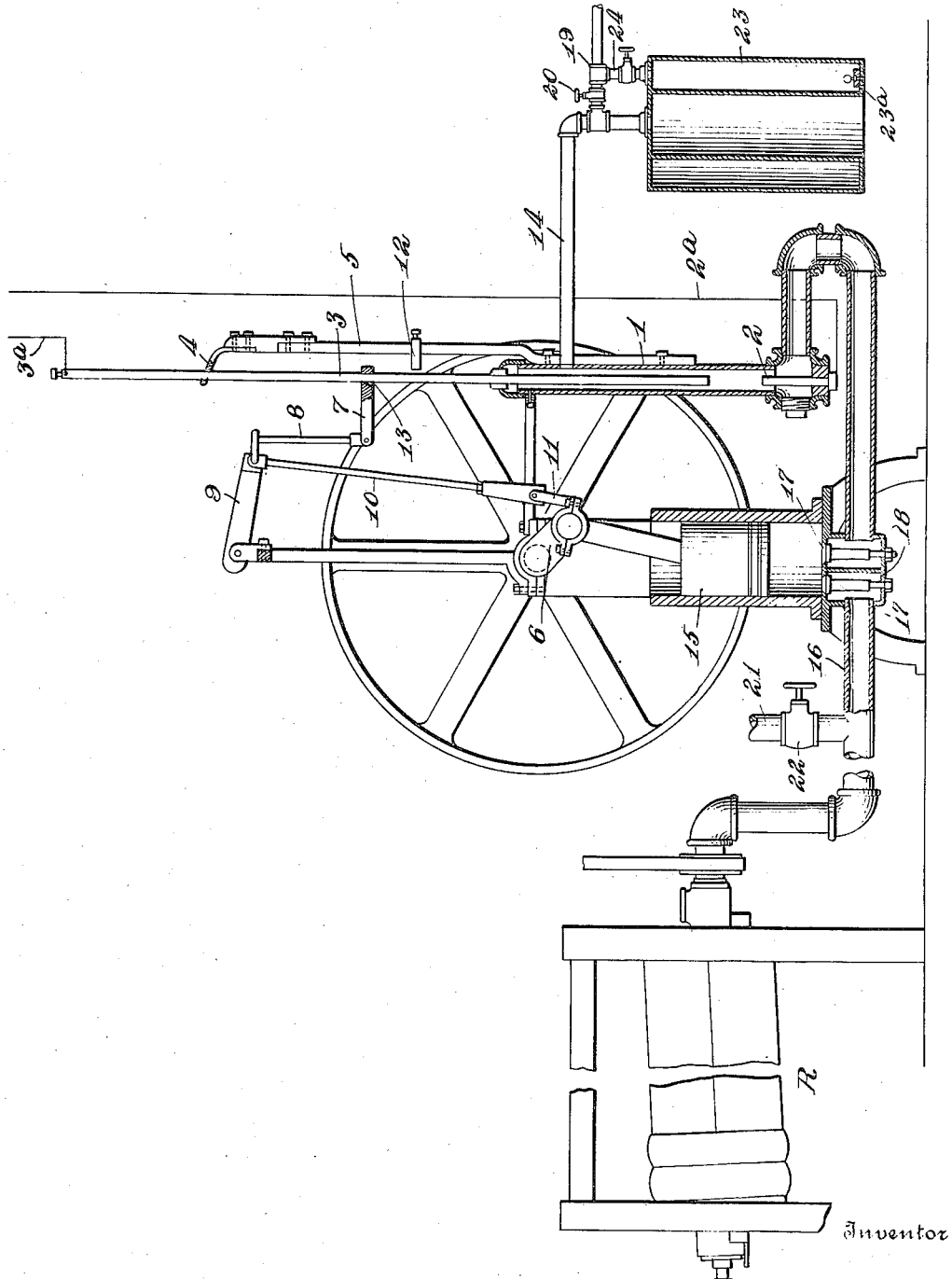
Witnesses
Inventor
James N. Alsop
By Meyers Cushman & Rea
Attorney

UNITED STATES PATENT OFFICE.

JAMES NATHANIEL ALSOP, OF OWENSBORO, KENTUCKY, ASSIGNOR TO NEW ALSOP FLOUR PROCESS COMPANY, OF PORTLAND, MAINE, A CORPORATION OF MAINE.

PROCESS OF TREATING FLOUR.

1,184,295.  Specification of Letters Patent.  Patented May 23, 1916.

Application filed November 19, 1914. Serial No. 873,038.

*To all whom it may concern:*

Be it known that I, JAMES N. ALSOP, a citizen of the United States, residing at Owensboro, in the county of Daviess and State of Kentucky, have invented new and useful Improvements in Processes of Treating Flour, of which the following is a specification.

This invention relates to a process of treating flour for the purpose of artificially aging or bleaching the same.

In U. S. Letters Patent granted to me May 10, 1904, No. 759,651, is set forth a process of treating flour which has gone into general and extensive commercial use in the United States as well as in numerous foreign countries, and the utility thereof is now well understood in the art. It has been found in proceeding according to the process of my said Letters Patent in cold weather and where the atmosphere is dry, the result of treating flour with the process according to said Letters Patent is insufficient to the attainment of the desired and best results.

I have discovered that by adding moisture to the atmosphere or gas to which the flour is subjected according to my said Letters Patent that improved results are attained in such cold and dry atmospheres as above mentioned. I have discovered, furthermore, that the moisture may be added to the atmosphere either before or after such atmosphere has been subjected to the action of the electric arc or flaming electric discharge; that it may be added in the form of steam, and that what I regard as the best results are secured by adding to the air or gaseous mixture sufficient moisture to saturate it. What I mean by this is;—atmospheric air contains moisture in various quantities, and, perhaps dependent upon geographical, topographical and other conditions, is susceptible of holding moisture in suspension in various quantities—in other words, the saturation point of the atmosphere differs in different localities; and by saturation point I mean that condition immediately preceding that in which the moisture collects or condenses in the form of dew or drops.

My present invention, therefore, consists broadly in the process of treating flour to an atmosphere which has been subjected to a disruptive electric discharge, of which arcs and flaming discharges are examples, and to which moisture has been added; and, also, in the particularities of treatment hereinafter set forth and claimed.

In the accompanying drawing I have illustrated an apparatus suitable for carrying the invention into practical use, and in this drawing the apparatus is illustrated more or less conventionally and largely in section.

A description of the process of treating flour utilizing the illustrated apparatus will be sufficiently descriptive of such process when other apparatus is employed for carrying the same into use.

In the said drawing, the reference numeral 1 designates a chamber in which the atmosphere is subjected to the action of disruptive electric discharge, and preferably this is an intermittent flaming discharge, as contemplated in my aforesaid Letters Patent, 2 designating the fixed electrode, and 3 the movable electrode, having suitable connection 2ª, 3ª, with a source of electricity which may be such as and arranged as shown in my aforesaid Letters Patent No. 759,651—said electrodes being preferably of carbon, although electrodes of other material, such as iron, which will not introduce any deleterious substance into the atmosphere or gas may be employed. The movable electrode is guided in its movement by an eye 4 carried by an arm 5 supported, as shown suitably from the treating chamber 1, and is intermittently moved toward and from the fixed electrode to strike, elongate, and break the electric discharge by link connections from the operating crank 6 of the pump by which the atmospheric air is caused to flow through the treating chamber and the ultimate atmosphere or gas passed into contact with the flour. As shown in the drawing, the electrode is gripped by an arm 7 pivotally connected by a link 8 of insulating material to one end of a walking beam 9, which in turn has link connection 10, 11, with the crank 6. To feed the electrode as it is consumed, an abutment 12 of insulating material carried by the arm 5 is arranged in the path of movement of the gripper arm 7, so that at each forward reciprocation of the electrode the abutment engages the gripping arm, turns it upon its pivotal connection with the link 8, and, by reason of the flaring wall of the perforation 13 of the gripper arm frees the electrode from the latter and allows it to feed.

The object of this arrangement is, generally, to bring the movable electrode into contact with the stationary one to strike an arc, so that a low voltage may be employed, then move it away to elongate the arc until it breaks, a rapid succession of arcs being made and broken during the operation of the apparatus, which character of electric discharge is preferred. The invention, however, is not restricted to such discharge, as a stable arc, now well known in the electric-chemical art, may well serve the purpose.

The numeral 14 designates a suitable air conduit by which atmospheric air is drawn into, through and out of the treating chamber 1 by means of a suitable pump 15, and by which pump the atmosphere or gas is then sent into contact with the flour, in a reel R, to be treated while the flour is in a state of fine division, as is customary in a bolting reel, through a suitable conduit 16, the pump having appropriate valves 17 arranged in appropriate valve chambers 18.

19 designates a conduit suitably provided with a regulating valve 20 through which steam from any suitable source is introduced into the atmosphere in conduit 14, and by which steam is conveniently regulated in respect to such atmosphere.

As shown in the drawing, the steam is introduced to the atmosphere prior to the action of the electric discharge. As has been stated, a suitable alternative is that the moisture may be introduced into the air or gas after the action of the arc, in which case the steam will be introduced into the conduit 16 leading to the flour treating chamber through a suitable conduit 21, provided with an appropriate regulating valve 22, and, if desired, and as shown, apparatus for practising my invention may be provided with suitable means for the introduction of steam at both points, so that either may be used electively.

I desire it understood that my invention is not limited to the introduction of moisture to the atmosphere by means of steam, as that is merely preferential. This may be accomplished in various ways which will be obvious to one putting the invention into practice and by passing the heated atmosphere through a body of water, etc.

The regulating valves referred to enable the operator to introduce the desired quantity of moisture to the atmosphere or gas. A suitable guide for him will, as above stated, be the saturation of the gas with the moisture as above explained. The meaning of this term, in so far as concerns my invention, has been above explained. Obviously the opertator may vary the amount of moisture introduced into the atmosphere or gas according to particular conditions with varying degrees of beneficial results, and, therefore, my invention is not limited to the saturation of the air with moisture.

The process is, I believe, facilitated by a suitable preheating of the atmospheric air, and, therefore, preferably, it is so preheated. This is accomplished by providing an annular, hollow chamber 23, provided with a drain cock 23ª, into which steam may be introduced through the valved pipe 24, so that the air passing through this hollow, annular chamber into the conduit 14 may be preheated.

In practising the invention, a current with a constant potential of 500 volts and of from 7 to 10 amperes may be advantageously used. I have found that the quantity of atmospheric air drawn through the apparatus and subjected to the electric arc may vary within wide limits without appreciably affecting the result attained. If there be any appreciable difference, it is only in the length of time during which the flour is subjected to the treatment, and this can be readily determined by testing the flour as to its color.

Having thus described the invention, what is claimed is:—

1. In a process of bleaching and maturing flour by atmospheric air modified by disruptive electric discharge, adding moisture to said atmosphere prior to the action of the electric discharge thereon.

2. In a process of bleaching and maturing flour by atmospheric air modified by disruptive electric discharge, preheating said atmosphere prior to the action of the electric discharge thereon and adding moisture thereto.

3. The process of bleaching and maturing flour by atmospheric air modified by disruptive electric discharge, preheating said atmosphere and adding moisture thereto to the point of saturation of said preheated atmosphere prior to the action of the electric discharge thereon.

In testimony whereof I have hereunto set my hand in presence of two subscribing witnesses.

JAMES NATHANIEL ALSOP.

Witnesses:
J. L. MILLER,
LUCIUS P. LITTLE.